United States Patent [19]
Yoshida et al.

[11] Patent Number: 5,774,207
[45] Date of Patent: Jun. 30, 1998

[54] LIGHT SCANNER

[75] Inventors: Masaharu Yoshida, Tokyo; Ken'ichi Arakawa, Tokorozawa; Kazuyoshi Tateishi, Ichihara, all of Japan

[73] Assignee: Nippon Telegraph and Telephone Corporation, Tokyo, Japan

[21] Appl. No.: 671,482

[22] Filed: Jun. 27, 1996

[30] Foreign Application Priority Data

Jun. 28, 1995 [JP] Japan ................................ 7-162411
Sep. 14, 1995 [JP] Japan ................................ 7-237211

[51] Int. Cl.$^6$ ............................ G01C 3/00; G01B 11/26; G01B 11/24
[52] U.S. Cl. .................... 356/3.09; 356/141.4; 356/376
[58] Field of Search ................................ 359/212, 213, 359/214, 223, 224, 225; 356/3.09, 141.4, 376

[56] References Cited

U.S. PATENT DOCUMENTS

| | | | |
|---|---|---|---|
| 3,781,111 | 12/1973 | Fletcher et al. ........................ | 356/5 |
| 5,067,817 | 11/1991 | Glenn ...................................... | 356/376 |
| 5,111,056 | 5/1992 | Yoshimura et al. ..................... | 250/560 |
| 5,177,631 | 1/1993 | Orlicki et al. .......................... | 359/214 |
| 5,245,463 | 9/1993 | Goto ........................................ | 359/214 |
| 5,280,165 | 1/1994 | Dvorkis et al. ......................... | 235/470 |
| 5,559,319 | 9/1996 | Peng ........................................ | 235/462 |

FOREIGN PATENT DOCUMENTS 7-93454  4/1995  Japan .

OTHER PUBLICATIONS

Patent Abstracts of Japan, vol. 13, No. 1 (P–808), Jan. 6, 1989, JP–A–63210605.
Patent Abstracts of Japan, vol. 7, No. 6 (P–167), Jan. 11, 1983, JP–A–57164445.
Oomen et al., "A Real–Time Optical Profile Sensor For Robot Arc Welding", Proceedings of the 3rd International Conference on Robot Vision and Sensory Controls, pp.659–668, 1983.

Appels, "Application and Economic Aspects of a 3–dimensional HeNe Laser Sensor", Automated and Robotics Welding, pp.223–232, 1987.

Rioux, "Laser Range Finder Based on Synchronized Scanners", Applied Optics, 23(21):3837–3844 (1984).

Sawano et al, "A Sealing Robot With Visual Seam Tracking", Proceedings of 1983 International Conference on Advanced Robots, pp.351–358, 1983.

*Primary Examiner*—Mark Hellner
*Attorney, Agent, or Firm*—Finnegan, Henderson, Farabow, Garrett & Dunner, L.L.P.

[57] ABSTRACT

The present invention offers a light scanner which is compact and highly precise during high-speed operation, has a long lifespan, and is resistant to influence by external acceleration. Specifically, a light beam emitted from an optical source 20 is separated into two light beams by means of a light beam separation means 30, and these light beams are deflected by a mirror 43 on the scanner 40. On of the light beams is used for the object of usage, while the other light beam is made incident on a photo detector 50 which outputs a signal based on the incident position of the light beam, in order to determine the deflection angle of the light beam based on vibrations of the mirror 43.

11 Claims, 6 Drawing Sheets

LIGHT SCANNER

BACKGROUND OF THE INVENTION

1. Technical Field of the Invention

The present invention relates to light scanners in range sensors which use light beams.

2. Background Art

The principles of measurement by means of range sensors using light beams are shown in FIG. 1. A light scanner and a light receiving device (neither are shown in the drawings) which form a range sensor is respectively positioned at points $P_1$ and $P_2$ separated by a distance l. When a light beam is emitted in the direction of an object A from the light scanner positioned at point $P_1$ and a reflection beam is received by the light receiving device positioned at point $P_2$, the distance L to the object A can be determined by the formula:

$$L = 1 \cdot \tan \alpha \cdot \tan \beta / (\tan \alpha + \tan \beta)$$

wherein a is the angle between the light beam emitted from point $P_1$ and the line connecting points $P_1$ and $P_2$ (deflection angle), and b is the angle between the beam received at point $P_2$ and the line connecting points $P_1$ and $P_2$ (reception angle).

By measuring the reception angle b while continuously changing the deflection angle a of the light beam by means of the light scanner, it is possible to measure the continuous distance L to the object A, i.e. to find the profile shape of the object A. As is clear from the above-given formula, the measurement precision in this case is determined by the deflection angle precision of the light scanner and the reception angle precision of the receiving device.

Conventionally, galvano-mirrors and polygonal mirrors are used as light scanners. As shown in FIG. 2, galvano-mirrors are galvanometer drive devices, such as the galvanometer 5 having an electromagnet 1, a magnet 2, a yoke 3, and a shaft 4, wherein a mirror 6 has been provided on the shaft 4 in place of a pointer, so as to be able to deflect a light beam from an optical source 7 by rotating the mirror 6 back and forth over a constant angle. Since galvano-mirrors allow the rotational angle of the mirror 6 to be made approximately proportional to the electrical current by careful design of the balance spring (not shown in the drawing) and the magnetic circuit formed by the electromagnet 1, the magnet 2 and the yoke 3, they are able to attain high precision with a simple structure (in actual practice, DC servo motors are often used as the drive devices due to insufficient drive torque).

However, since the drive device 5 and the mirror 6 are separated in a galvano-mirror, vibrations can occur in the shaft 4 or the mirror 6 upon high-speed operation, so that it becomes difficult to maintain the proportional relation between the rotational angle and the circuit current. For this reason, when galvano-mirrors are used in range sensors as explained in FIG. 1, they have the drawback that the deflection angle of the light beam can become inaccurate so as to generate errors in the distance being measured. Additionally, the reciprocatory movement of the shaft 4 can generate friction if the lubrication between the shaft 4 and the bearings (not shown in the drawings) is insufficient, so that high-speed operation can shorten the lifespan of the bearings.

As shown in FIG. 3, polygonal mirrors have a rotating mirror 8 having a mirror on each face of a polygon, a hexagon in this case, which is attached to a shaft 10 of a motor 9, so as to cause a light beam from an optical source 7 to be deflected by means of high-speed rotation. The photo detector 11 generates a signal when a light beam deflected by each mirrored face of the rotating mirror 8 is incident thereon, and this signal is used as a synchronization signal for the light scanner. Polygonal mirrors allow the deflection angle of the light beam to be determined indirectly by measuring the period of time since the generation of a synchronization signal (when the light beam is incident on the photo detector 1) if the rotational speed of the rotating mirror 8 is constant and known.

However, polygonal mirrors have the drawback that they are difficult to miniaturize, since rotational wobbling of the rotating mirror 8 directly influences the precision, so that rotational wobbling is generally reduced by reducing rotational wobbling of the motor itself by using a large multipolar motor, and increasing the weight of the rotating mirror 8 while increasing the number of rotations, thereby increasing the angular moment due to the moment of inertia.

Additionally, both of these light scanners use mechanical systems, so that when they are provided on the arms of industrial robots, they are influenced by accelerative motion of the arms, thereby making the deflection angle less accurate.

SUMMARY OF THE INVENTION

The object of the present invention is to offer a light scanner which is compact, highly precise during high-speed operation, has a long lifespan, and is resistant to influence by external acceleration.

In order to achieve this object, the present invention offers a light deflection apparatus, for deflecting a light beam emitted from an optical source by a specific angle, wherein a second light beam having a constant relationship with said light beam is prepared, comprising: an electromagnet; a movable portion having a metallic leaf and an elastic body supporting said metallic leaf; and a mirror affixed to said movable portion; wherein said movable portion is vibrated by running an intermittent electrical current through said electromagnet, thereby deflecting the two light beams, and a photo detector for outputting signals based on an incident position of light is provided at a position of irradiation of said second light beam after deflection.

PREFERRED EMBODIMENTS OF THE INVENTION

Figure 4:
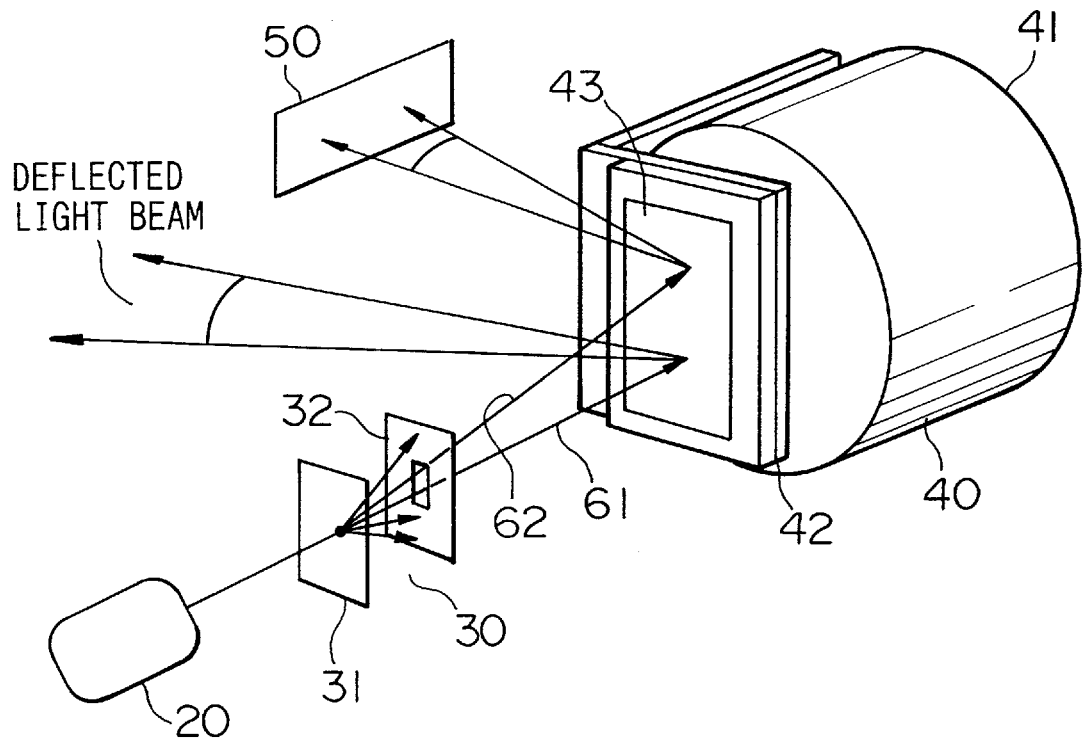
FIG. 4 is a diagram showing a first embodiment of a light scanner according to the present invention.

FIG. 4 shows a first embodiment of the a light scanner according to the present invention, wherein reference numeral 20 denotes an optical source, reference numeral 30 denotes a light beam separation means, reference numeral 40 denotes a scanner, and reference numeral 50 denotes a photo detector.

The optical source 20 emits a single light beam, and a semiconductor laser is used in this case. The light beam separation means 30 splits the light beam, and a diffraction grating 31 and a slit 32 are used in this case. The light beam separation means 30 is positioned between the optical source 20 and the scanner 40, so as to separate the single light beam emitted from the optical source 20 into a plurality of light beams by means of the diffraction grating 31. Of the separated light beams, the zero-th order beam becomes the first light beam 61 used for distance measurement, and one of the first order beams (a first order beam appears on both sides) becomes the second light beam 62 used for deflection angle measurement. The remaining diffraction beams are shut off by means of the slit 32.

Figure 5:
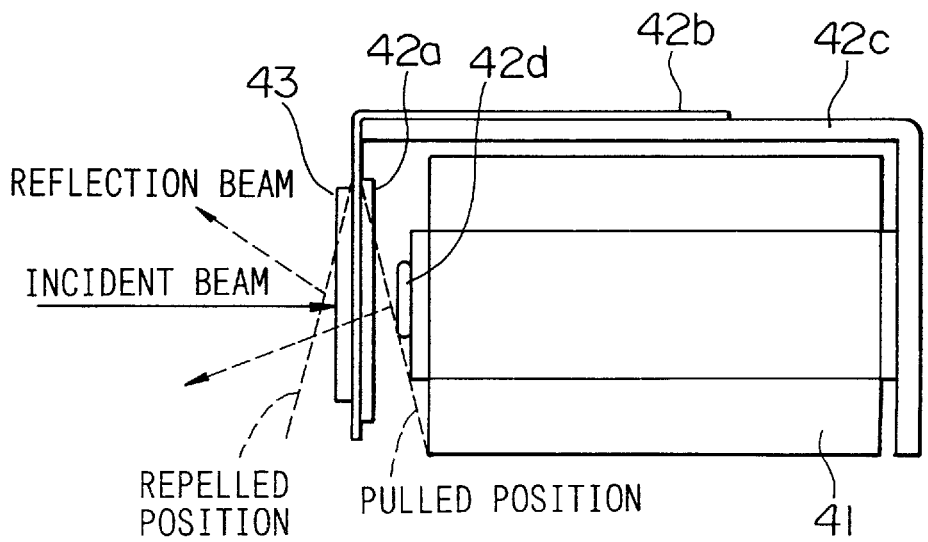
FIG. 5 is a diagram showing the detailed structure and operation of a light scanner according to the present invention.

The scanner 40 comprises an electromagnet 41, a movable portion 42, and a mirror 43 attached to the movable portion 42. The movable portion 42 comprises an iron leaf 42a, an elastic body 42b and a frame 42c as shown in FIG. 5. The iron leaf 42a is attached to one end of the elastic body 42b, and is supported by the frame 42 so as to be able to vibrate while orthogonally intersecting the axis of the electromagnet 41. The scanner 40 is positioned so that the first light beam 61 and the second light beam 62 hit the mirror 43. Additionally, reference numeral 42d denotes a damper for controlling vibrations.

When an electrical current is run through the electromagnet 41, the iron leaf 42a is affected by the magnetic force of the electromagnet 41, so that the elastic body 42b is deformed and pulled toward the electromagnet 41. As a result, the iron leaf 42a moves closer to the electromagnet 41, and since the mirror 43 moves simultaneously therewith, the light beam is deflected downwards as seen in FIG. 5. Next, the magnetic force is eliminated when the electrical current to the electromagnet 41 is turned off, so that the elastic force of the elastic body 42b causes the iron leaf to move past the original position due to its momentum, thereby deflecting the light beam upwards as seen in FIG. 5. In this way, the light beam can be deflected up and down by intermittently running an electrical current through the electromagnet 41. With this structure, there is no potential for wear to occur because there are no shafts or bearings for connecting the movable parts, so that the performance of the scanner 40 is not degraded, and a long-term, stable operation can be expected. Additionally, the scanner 40 can easily be made more compact and lighter, so that it is possible to offer the scanner 40 cheaply.

Additionally, the iron leaf 42a in the movable portion 42 is normally set so as to move within a range out of contact with the electromagnet 41, because if the iron leaf 42a contacts the electromagnet 41, then problems such as vibrations and noise can occur or the movement of the movable portion can become erratic. However, surplus electrical current when the power is turned on or vibrations from external sources can cause the iron leaf 42a to contact the electromagnet 41. Since the electromagnetic force is inversely proportional to approximately the distance cubed, once the iron leaf 42a contacts the electromagnet 41, it goes into a state of over-excitation from which it is difficult to return to the original state. Therefore, the vibrations are controlled by means of said damper 42d.

The photo detector 50 outputs a signal based on the incident position of the light beam, and a position sensing device (PSD) which outputs a photoelectric current based on the incident position of the beam is used in this case. This photo detector 50 is positioned at the position of irradiation of the second light beam after being reflected by the mirror 43, and determines the deflection angle of the light beam from the incident position of the second light beam.

Next, the operation of the above-mentioned device will be explained.

The light beam from the optical source 20 is separated into a plurality of light beams by means of the diffraction grating 31, of which the zero-th order beam is extracted as the first light beam 61 for distance measurement and one of the first order beams is extracted as the second light beam 62 for deflection angle measurement. The remaining light beams are eliminated by means of the slit 32. The first light beam 61 and the second light beam 62 hit the mirror 43 of the scanner 40 and are reflected.

After reflection, the first light beam 61 is projected at the object (not shown in the drawings) and the second light beam 62 is incident on the photo detector 50, the positions of which change according to the angle of the mirror 43 of the scanner 40. As mentioned above, the deflection angle of the second light beam 62 is able to be determined from the output of the photo detector 50 which depends upon the incident position of the beam. In this case, the deflection angles of the first light beam and the second light beam are the same because they are reflected by the same mirror 43. Consequently, the deflection angle of the first light beam can be determined by determining the deflection angle of the second light beam.

Figure 6:
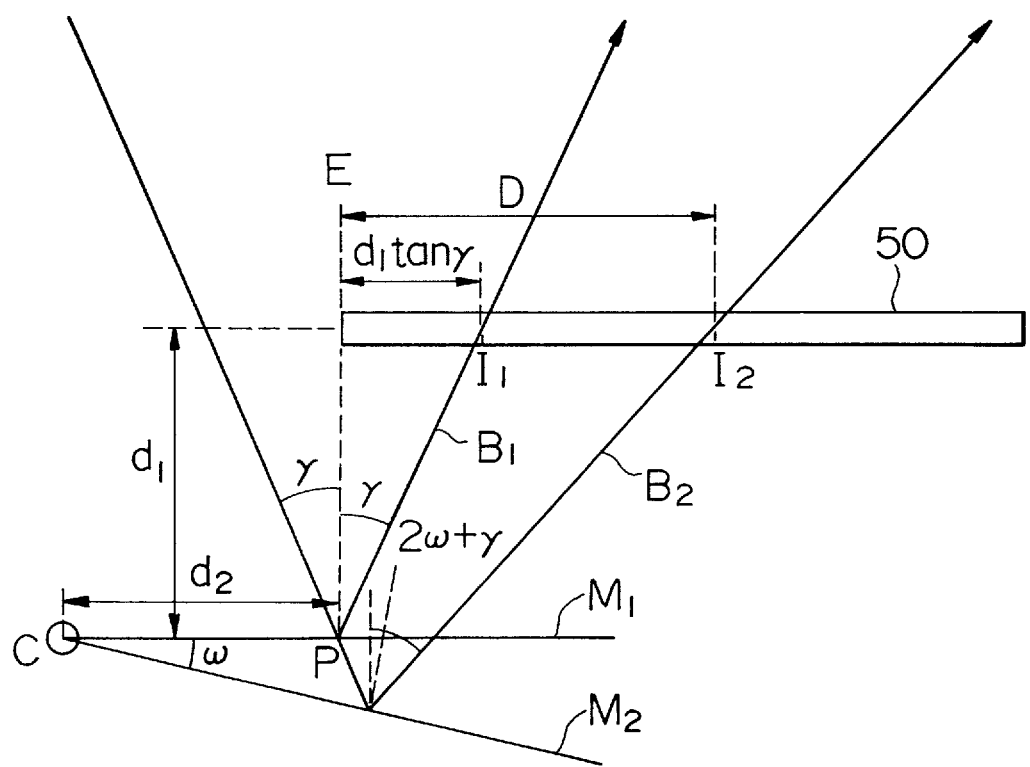
FIG. 6 is a diagram explaining the determination of a deflection angle from an output value of a photo detector in a light scanner according to the present invention.

FIG. 6 is a diagram explaining how the deflection angle is determined from the output value of the photo detector 50. The light beams $B_1$ and $B_2$, respectively deflected from the mirror $M_1$ which is in a state of equilibrium and the mirror $M_2$ which has been pulled over an angle W, are respectively incident upon the photo detector 50 at positions $I_1$ and $I_2$. At this time, an output value depending upon the position, for example an output value proportional to the distance from the end portion E, is outputted from the sensor 50. When the mirror $M_1$ is parallel to the photo detector 50 in a state of equilibrium, the distance $d_1$ between the mirror $M_1$ and the photo detector 50 and the beam reflection position P during equilibrium are known, the end portion E of the photo detector 50 lies on the normal line between the beam reflection position P and the mirror, there is a center C to the deformation of the elastic body, and the mirror remains flat even if the elastic body is deformed, then the tangent of the deflection angle tan W can be determined by solving the following third order equation, wherein g is the incident angle of the light beam to the mirror, $d_2$ is the distance from the optical reflection position P at equilibrium to the center of deflection C, and D is the distance from the end portion E to the incident position of the light beam when the elastic body is deflected.

$$(-d_1\tan^2\gamma + 2d_2\tan\gamma + D\tan\gamma)\tan^3\omega + \\ (2d_2\tan^2\gamma + 2D\tan^2\gamma + 3d_1\tan\gamma - 2d_2 - D)\tan^2\omega + \\ (d_1\tan^2\gamma - 2d_2\tan\gamma - 3D\tan\gamma - 2d_1)\tan\omega - d_1\tan\gamma + D = 0$$

Additionally, since the deflection angle a is equal to g+2W according to FIG. 6, its tangent tan a can be determined by the following equation.

$$\tan\alpha = \frac{2\tan\omega + \tan\gamma - \tan^2\omega\tan\gamma}{1 - \tan^2\omega - 2\tan\omega\tan\gamma}$$

While the above-given method assumes that the distance between the mirror and the photo detector as well as the optical reflection position on the mirror when the mirror is in the equilibrium state are accurately measured, and that the elastic body has a center of deflection, these assumptions are not realistic for these conditions when considering the operational principles involved. Furthermore, even with a simplified formula as given above, the formula for calculating the deflection angle from the output value of the photo detector is non-linear. Therefore, in order to deflect light in actual practice by means of a light scanner, it becomes necessary to solve an even higher order equation. Therefore, the present invention uses a circuit which determines the deflection angle according to a lookup table which has been prepared by actually measuring the deflection angle and the incident position of the light beam to the photo detector externally.

Since it is sufficient for the first and second light beams to be held in a constant relation, the portion of the scanner 40 that the first light beam hits and the portion which the second light beam hits can be composed of two mirrors with different angles, so as to deflect the second beam in an arbitrary direction different from that of the first light beam.

Additionally, while a diffraction grating and a slit were used as light beam separation means in the above example, a cube beam splitter formed by combining prisms can be used as an alternative. As a result, it is possible to attain deflection without reflective loss as with mirrors.

Additionally, while the two separated light beams were made incident on the scanner and deflected together in the above example, it is also possible to make one light beam incident, then separate the deflected light beam into two parts.

Figure 7:
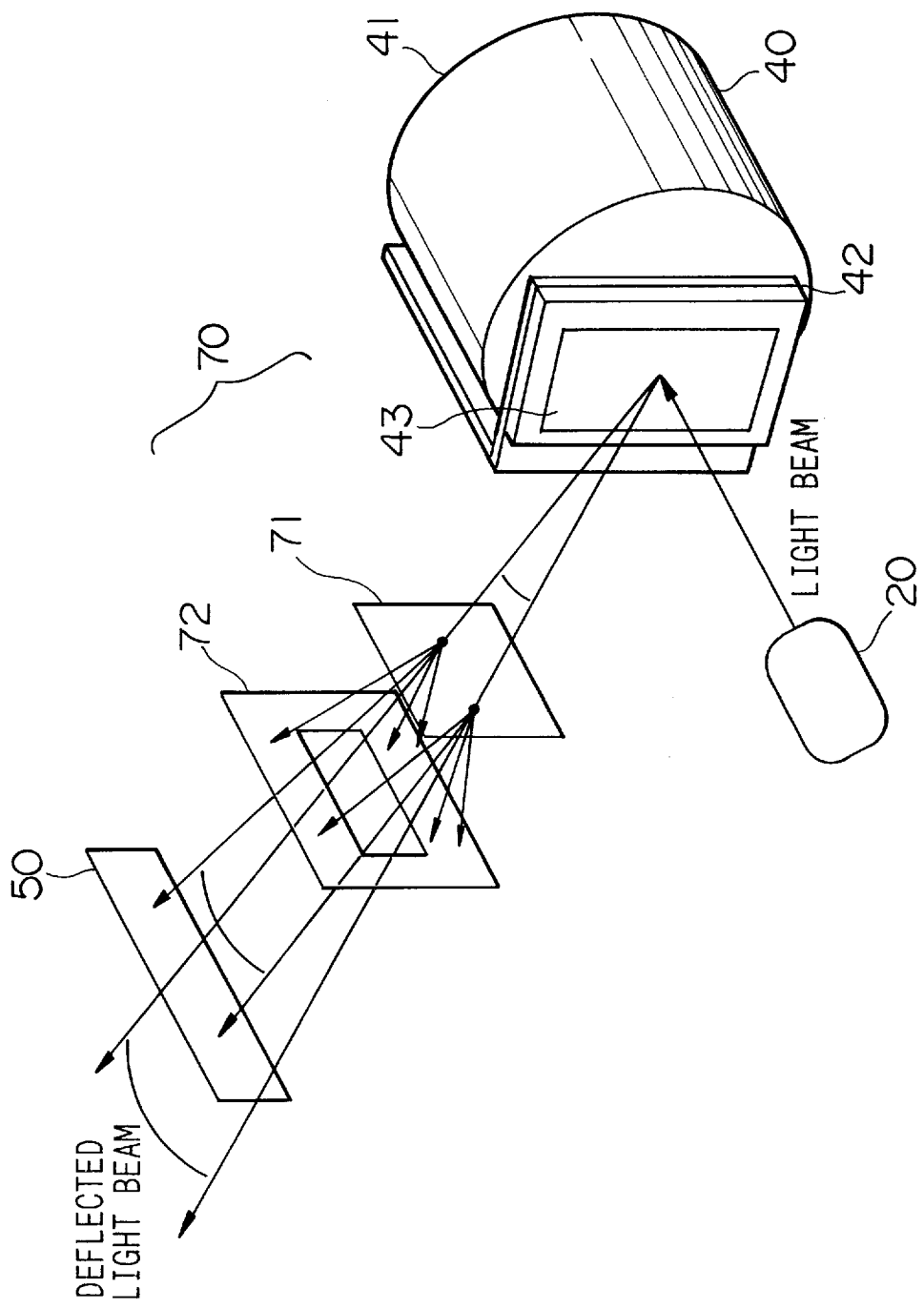
FIG. 7 is a diagram showing a second embodiment of a light scanner according to the present invention.

FIG. 7 shows a second embodiment of the present invention, wherein a single light beam is separated after deflection. That is, in the diagram, reference numeral 70 denotes light beam separation means, comprising a diffraction grating 71 and a slit 72, this light beam separation means 70 being positioned between the scanner 40 and the photo detector 50. The diffraction grating 71 and the slit 72 are structured so as to correspond to the range of deflection of the single light beam deflected by means of the scanner 40. Consequently, it is possible to obtain a first light beam for distance measurement and a second light beam for measurement of the deflection angle, as with the first embodiment. The remaining structure and operation are identical to those of the first embodiment.

With the light scanner of the present invention, it is difficult to determine the deflection angle of the light beam from the electrical current or other information, thereby differing from conventional galvano-mirrors or polygonal mirrors. That is, the relationship between the current running through the electromagnet and the deflection angle is determined by the elasticity of the elastic body, and is not a linear relationship. Additionally, when the elastic body is moved at high-speed, the momentum causes delays which make it difficult to determine the deflection angle from the electrical current in the electromagnet. For this reason, the light scanner of the present invention continually measures the deflection angle of the light beam by using the photo detector.

Figure 1:
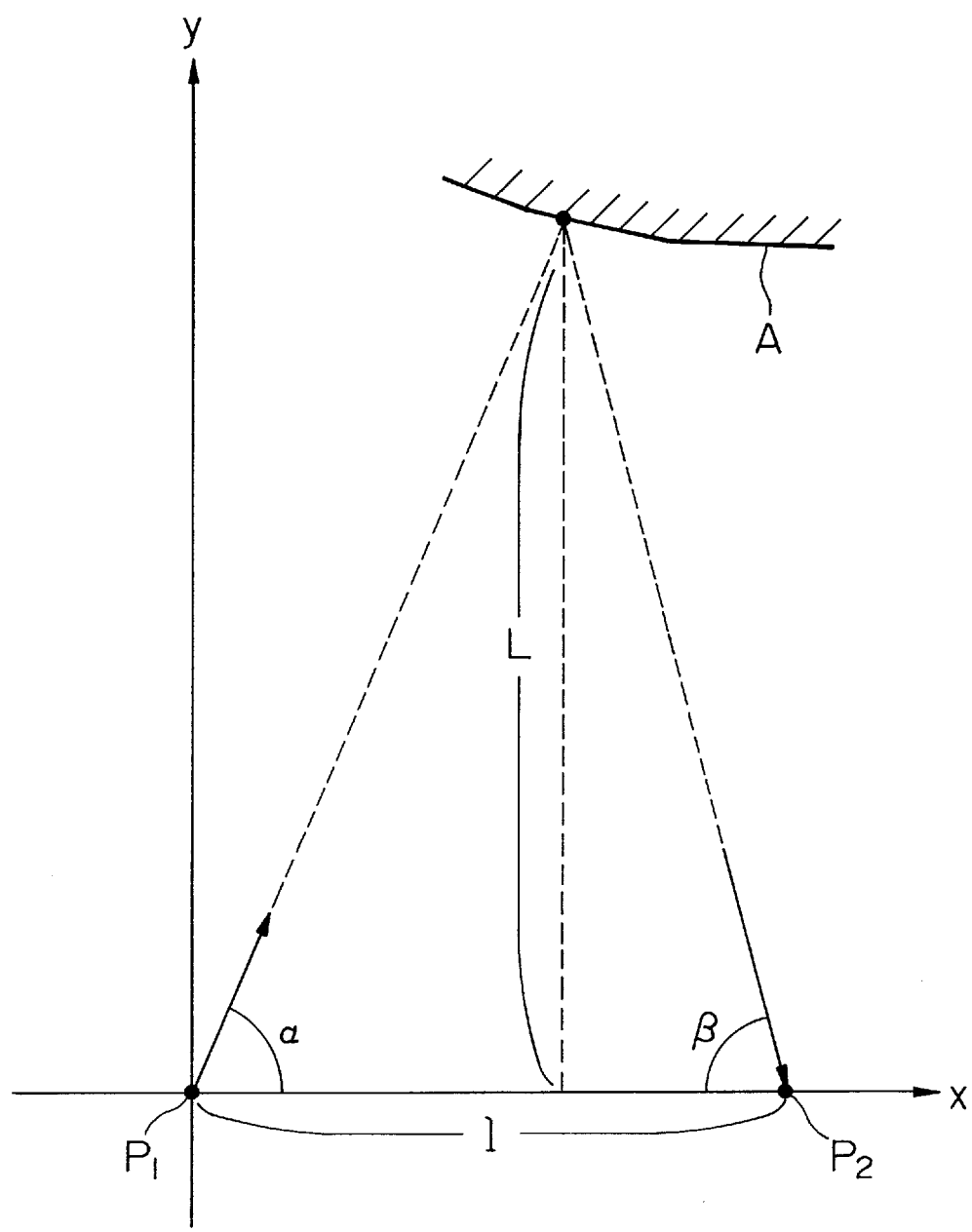
FIG. 1 is a diagram explaining the measuring principles for a range sensor using light beams.
Figure 2:
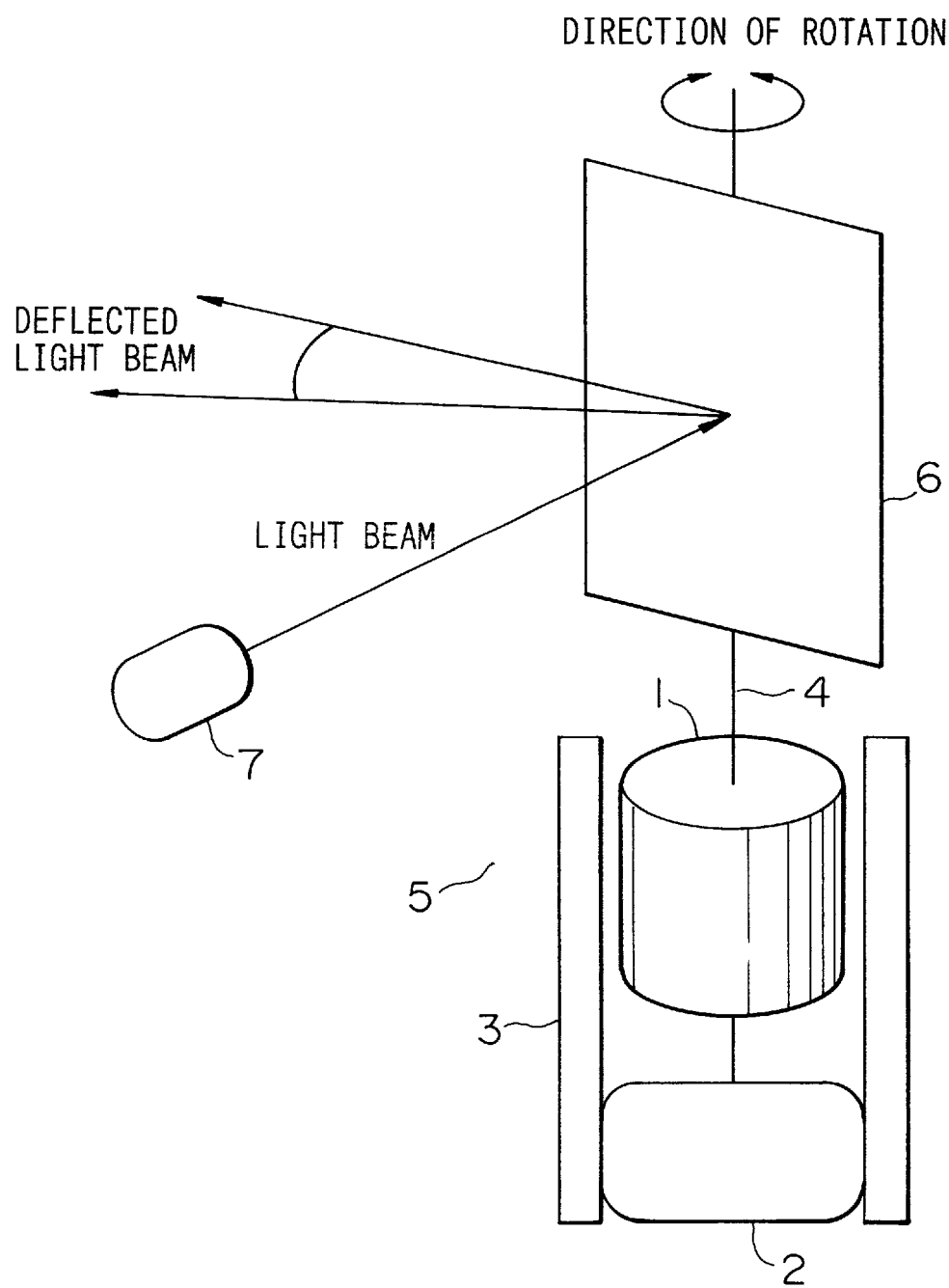
FIG. 2 is a diagram showing an example of a conventional light scanner.
Figure 3:
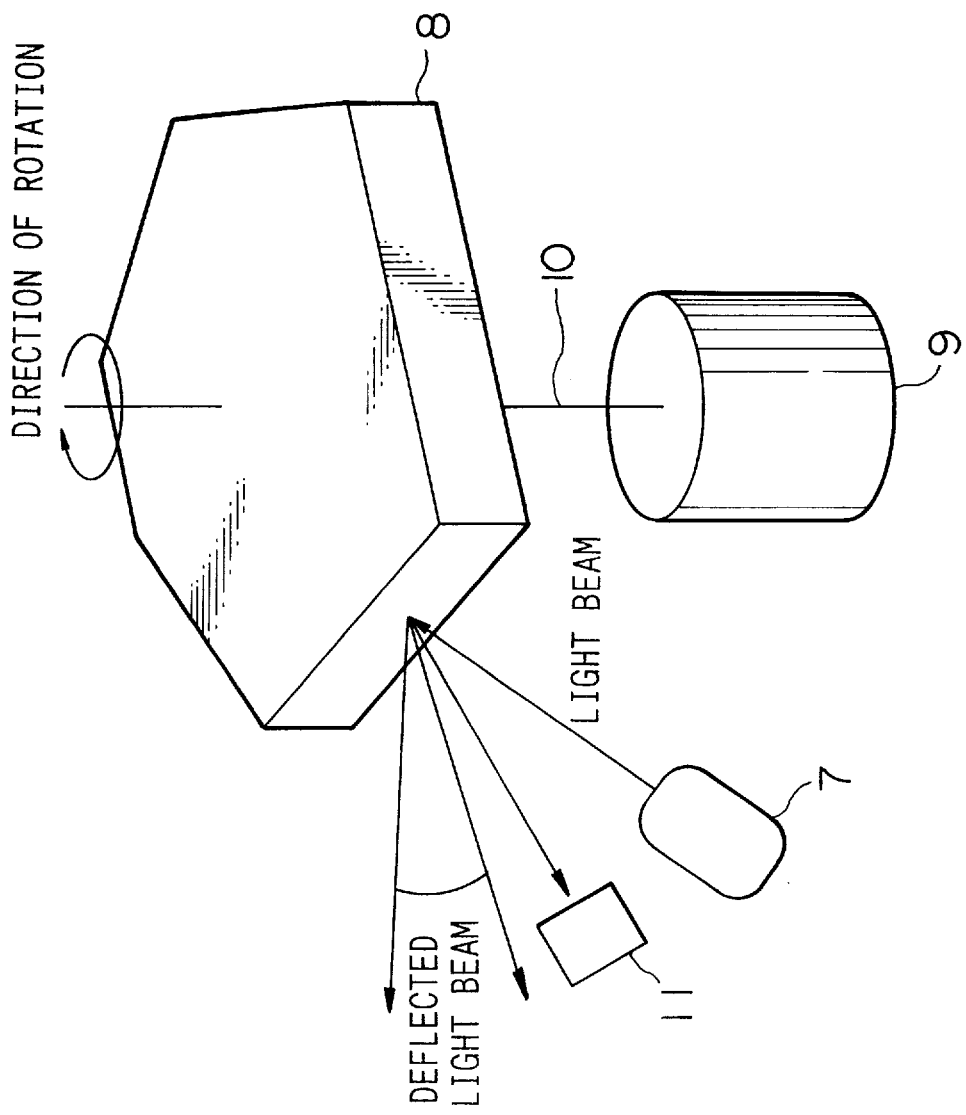
FIG. 3 is a diagram showing another example of a conventional light scanner.

The output value of this photo detector is proportional to the distance from a specific position on the photo detector to the incident position of the light beam. When there is a center of deflection of the elastic body, the flatness of the mirror is ensured, and the distance between the mirror and the photo detector as well as the reflection position of the light beam when the mirror is in a state of equilibrium are known, it is possible to determine tan a as shown in FIG. 1 from the output value by forming a circuit to solve a third-order equation as given above. However, in actual practice, the output value depends upon non-linear functions having the deflection angle as a parameter due to the work precision and deformation of the elastic body, and it is difficult to measure the factors thereof. Therefore, in the present invention, the value of tan a is calculated from the output value of the photo detector based on a lookup table which has been prepared by corresponding the deflection scanning direction of the light beam with the output value of the photo detector on the object of measurement.

Additionally, while it is in principle impossible to control the deflection angle of the light beam to be a desired angle at an arbitrary point in time, this is not a problem when the profile shape of the object is being measured as explained for FIG. 1. This is because the values of a and b in FIG. 1 are able to be measured.

Furthermore, since the light scanner of the present invention continually measures the deflection angle, the deflection precision is not degraded, because even when the deflection angle of the mirror becomes erratic due to external acceleration such as in the case of attachment to a robot arm, the angle is able to be measured during such erratic movement.

Additionally, a permanent magnet may be used instead of the iron leaf in the present invention. That is, while the electromagnet must generate sufficient electromagnetic force to overcome the elastic force of the elastic body in order to move the movable portion, the electromagnetic force required by the electromagnet can be reduced by replacing the iron leaf with a permanent magnet. Consequently, the electromagnet can be made smaller, and thus the sensor head can also be made smaller, thereby reducing the expenditure of electrical power. While one might consider weakening the elastic force of the elastic body in order to make the electromagnet smaller, if the elastic force is reduced, then the mechanical resonance frequency of the movable portion is reduced and the scanning speed of the light beam is also reduced, which is undesirable because the measuring speed of the sensor using the light scanner is then reduced. Specifically, a weak permanent magnet which does not adhere to the electromagnet 41 is used instead of the iron leaf 42a.

Although some drawbacks of the device of the present invention can be considered to be the need to add a photo detector for deflection angle measurement and operational circuits to calculate the deflection angle from the output signals thereof, the prices of semiconductor elements are on the decline and the effect of lowering the cost of the scanner is much more crucial, so that such drawbacks do not present any remarkable problems.

We claim:

1. A light scanner for scanning a profile of an object, comprising:

an optical source for emitting a source light beam;

a source light beam separation means for separating said source light beam into a first light beam and a second light beam, the first light beam having a constant angular relationship with said second light beam, said first light beam being used for distance measurement, and said second light beam being used for deflection angle measurement;

a movable portion having a metallic leaf and an elastic body supporting said metallic leaf;

an electromagnet for vibrating said movable portion by intermittent electrical current;

a mirror affixed to said movable portion for deflecting said first and second light beams; and a photo-detector for detecting said second light beam after deflection and outputting signals based on an incident position of said deflected second light beam.

2. A light scanner for scanning a profile of an object, comprising:

an optical source for emitting a source light beam;

a movable portion having a metallic leaf and an elastic body supporting said metallic leaf;

an electromagnet for vibrating said movable portion by intermittent electrical current;

a mirror affixed to said movable portion for deflecting said source light beam;

a light beam separation means for separating said source light beam after deflection into a first light beam and a second light beam, the first light beam having a constant angular relationship with said second light beam, said first light beam being used for distance measurement, and said second light beam being used for deflection angle measurement; and a photo-detector for detecting said second light beam and outputting signals based on an incident position of said second light beam.

3. A light scanner for scanning a profile of an object, comprising:

an optical source for emitting a source light beam;

a source light beam separation means for separating said source light beam into a first light beam and a second light beam, the first light beam having a constant angular relationship with said second light beam, said first light beam being used for distance measurement, and said second light beam being used for deflection angle measurement;

a movable portion having a metallic leaf and an elastic body supporting said metallic leaf;

an electromagnet for vibrating said movable portion by intermittent electrical current;

a prism affixed to said movable portion for deflecting said first and second light beams; and a photo-detector for detecting said second light beam after deflection and outputting signals based on an incident position of said deflected second light beam.

4. A light scanner for scanning a profile of an object, comprising:

an optical source for emitting a source light beam;

a movable portion having a metallic leaf and an elastic body supporting said metallic leaf;

an electromagnet for vibrating said movable portion by intermittent electrical current;

a prism affixed to said movable portion for deflecting said source light beam;

a light beam separation means for separating said source light beam after deflection into a first light beam and a second light beam, the first light beam having a constant angular relationship with said second light beam, said first light beam being used for distance measurement, and said second light beam being used for deflection angle measurement; and a photo-detector for detecting said second light beam and outputting signals based on an incident position of said second light beam.

5. A light scanner for scanning a profile of an object, comprising:

an optical source for emitting a source light beam;

a source light beam separation means for separating said source light beam into a first light beam and a second light beam, the first light beam having a constant angular relationship with said second light beam, said first light beam being used for distance measurement, and said second light beam being used for deflection angle measurement;

a movable portion having a permanent magnet and an elastic body supporting said permanent magnet;

an electromagnet for vibrating said movable portion by intermittent electrical current;

a mirror affixed to said movable portion for deflecting said first and second light beams; and a photo-detector for detecting said second light beam after deflection and outputting signals based on an incident position of said deflected second light beam.

6. A light scanner for scanning a profile of an object, comprising:

an optical source for emitting a source light beam;

a movable portion having a permanent magnet and an elastic body supporting said permanent magnet;

an electromagnet for vibrating said movable portion by intermittent electrical current;

a mirror affixed to said movable portion for deflecting said source light beam;

a light beam separation means for separating said source light beam after deflection into a first light beam and a second light beam, the first light beam having a constant angular relationship with said second light beam, said first light beam being used for distance measurement, and said second light beam being used for deflection angle measurement; and a photo-detector for detecting said second light beam and outputting signals based on an incident position of said second light beam.

7. A light scanner for scanning a profile of an object, comprising:

an optical source for emitting a source light beam;

a source light beam separation means for separating said source light beam into a first light beam and a second light beam, the first light beam having a constant angular relationship with said second light beam, said first light beam being used for distance measurement, and said second light beam being used for deflection angle measurement;

a movable portion having a permanent magnet and an elastic body supporting said permanent magnet;

an electromagnet for vibrating said movable portion by intermittent electrical current;

a prism affixed to said movable portion for deflecting said first and second light beams; and a photo-detector for detecting said second light beam after deflection and outputting signals based on an incident position of said deflected second light beam.

8. A light scanner for scanning a profile of an object, comprising:

an optical source for emitting a source light beam;

a movable portion having a permanent magnet and an elastic body supporting said permanent magnet;

an electromagnet for vibrating said movable portion by intermittent electrical current;

a prism affixed to said movable portion for deflecting said source light beam;

a light beam separation means for separating said source light beam after deflection into a first light beam and a second light beam, the first light beam having a constant angular relationship with said second light beam, said first light beam being used for distance measurement, and said second light beam being used for deflection angle measurement; and a photo-detector for detecting said second light beam and outputting signals based on an incident position of said second light beam.

9. A light scanner according to one of claims 1–8, further comprising:

a damper affixed to said movable portion of said scanner.

10. A light scanner according to one of claims 1–8, further comprising:

a circuit for converting an output value of said photo-detector, which receives said second light beam after deflection and outputs a signal based on the incident position of said second light beam, into a signal based on the deflection angle.

11. A light scanner according to claim 10, wherein said circuit for converting an output value of said photo-detector into a signal based on the deflection angle uses a lookup table between the incident position of said second light beam on said photo-detector and the deflection angle.

* * * * *